A. WILZIN.
GLASS BLOWING MACHINE.
APPLICATION FILED MAR. 3, 1917.

1,292,940.

Patented Jan. 28, 1919.
2 SHEETS—SHEET 1.

INVENTOR
Arthur Wilzin
per John S. Haworth
Attorney

A. WILZIN.
GLASS BLOWING MACHINE.
APPLICATION FILED MAR. 3, 1917.
1,292,940.
Patented Jan. 28, 1919.
2 SHEETS—SHEET 2.
Fig. 2.
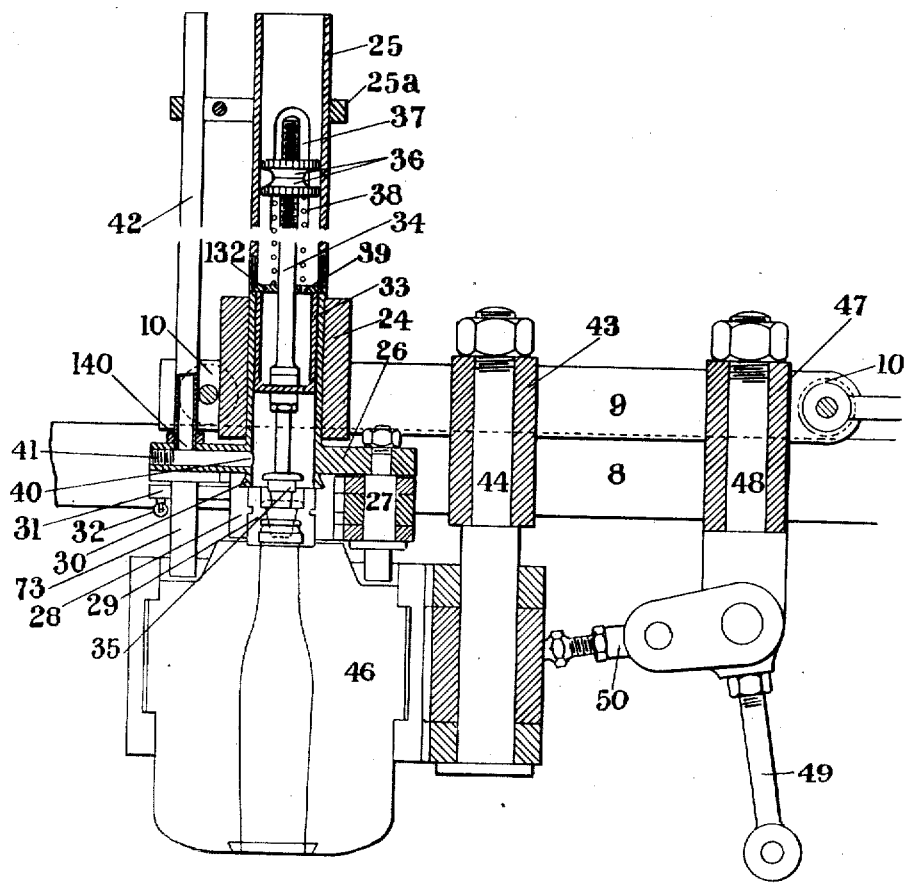
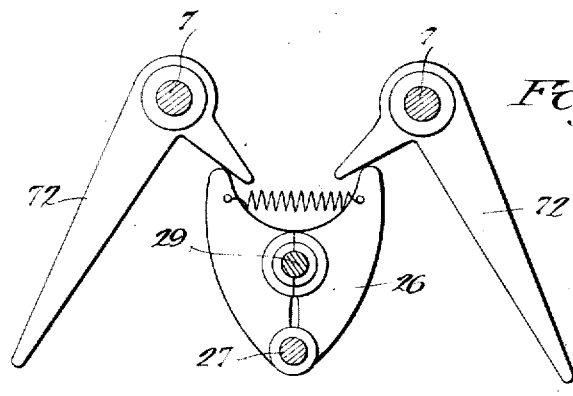
Fig. 3.
INVENTOR
Arthur Wilzin
her John F. Raworth
Attorney

UNITED STATES PATENT OFFICE.

ARTHUR WILZIN, OF ST. OUEN, FRANCE.

GLASS-BLOWING MACHINE.

1,292,940.

Specification of Letters Patent. Patented Jan. 28, 1919.

Application filed March 3, 1917. Serial No. 152,343.

*To all whom it may concern:*

Be it known that I, ARTHUR WILZIN, a citizen of the United States of America, and resident of St. Ouen, Seine, France, have invented new and useful Improvements in Glass-Blowing Machines, of which the following is a specification.

This invention relates to machines for the manufacture of glass bottles, and has to do more especially with machines of the kind in which a primary or parison mold is first used to measure out the correct quantity of molten glass and to roughly shape it into the form of a bottle, after which the same is transferred to a finishing mold and the blowing and molding operation is completed. In glass machines involving this structure it is necessary that the molds move relative to each other and difficulty is often experienced by the molds failing to assume correct relative positions during the transfer of the blank or parison from the parison to the finishing mold. Where a separate neck mold is used, the structure becomes still more complicated, as it is necessary to provide for very accurate adjustment of the neck mold with respect to the other molds, which adjustment is difficult to properly maintain because of the effect of the varying heat, and resultant expansion and contraction to which the different molds are exposed.

It is the primary object of this invention to provide a structure wherein the movement of the different molds with respect to each other is easily and at the same time accurately controlled.

Another object of this invention is to provide a structure in which the connection of the neck mold with the other molds is easily and quickly made and in which the joint between the neck mold and the other molds is not affected by the varying expansion and contraction of the different parts of the molding machine.

It is a further object of this invention to provide a structure in which the neck mold is wholly independent of the parison mold, and is vertically movable in relation thereto, and the construction being such that the neck mold when seated on the parison mold makes joint therewith solely by its own weight.

It is a further object of this invention to provide a structure in which the blowing or finishing mold is located in a lower horizontal plane than the parison mold, and the parison suspended from the neck mold is lowered vertically into the blowing or finishing mold.

It is a further object of this invention to provide a structure wherein the gathering device and the parison mold are so arranged as to be capable of movement in paths at right angles to each other, and are moved along their respective paths and brought into conjunction only during the filling of the parison mold, whereby the parison mold is subjected to the heat emanations from the furnace only at such time.

In order that the invention may be clearly understood, reference will be made to the accompanying drawings, in which:

Fig. 3 is a sectional plan view of the neck mold and its opening means.

Figure 1:
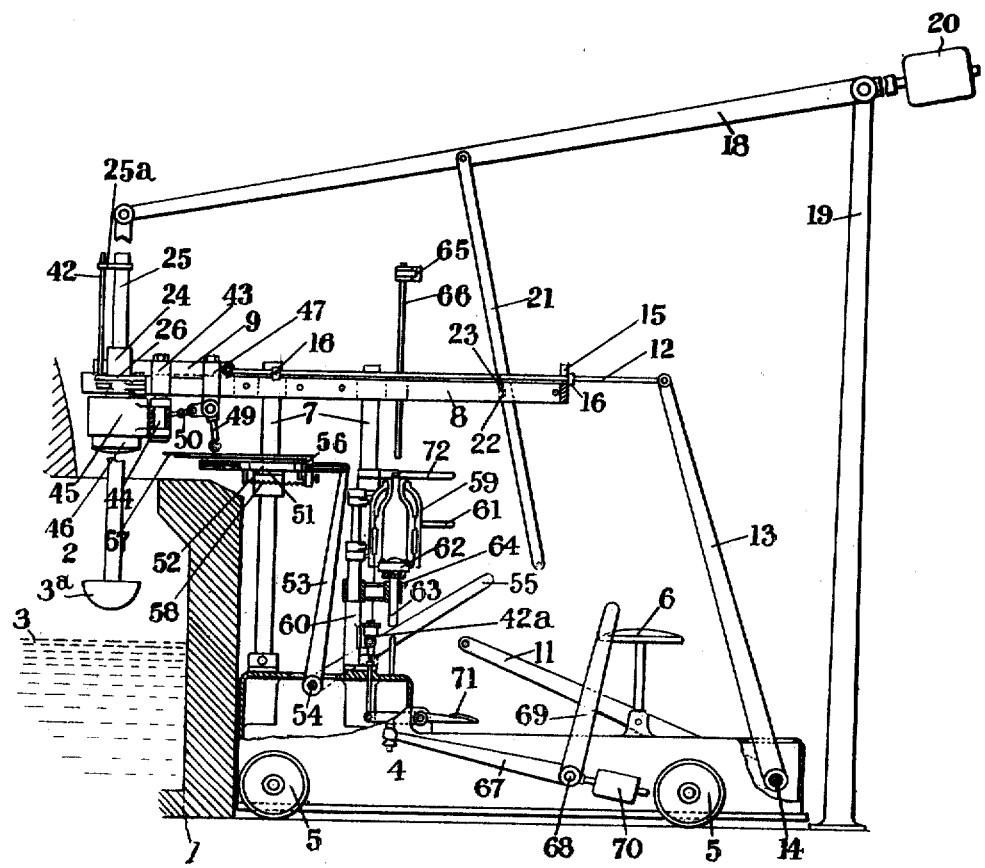
Figure 1 is an elevational view of a form of glass blowing and molding machine in accordance with this invention and, Fig. 2 is an enlarged sectional elevation of parts shown in Fig. 1, and showing in greater detail the construction of the neck and parison molds.

In the drawings, 1 represents a glass furnace provided with a gathering well 2 in which is contained a supply of molten glass 3.

Applicant's machine in the form shown, comprises among other parts a carriage 4 which is mounted upon wheels 5 and which may be moved toward or from the furnace 1 on suitable tracks or rails. When the machine is in operation, the operator is seated on the stool 6 carried by the carriage 4, the various elements of the machine being likewise mounted on the carriage 4, the controlling handles or levers of the machine all being arranged in positions convenient to the operator on stool 6.

Mounted on the carriage 4 are four standards or uprights 7, these standards being arranged at the corners of a rectangle. Mounted on the upper ends of standards 7 are two horizontal and parallel rails 8 which form a track for the wheels 10 of a second carriage 9 which carries the neck and parison molds and is adapted to convey these molds and other elements of the machine mounted thereon from a position above the gathering well of the furnace to a position above the blowing and finishing mold. The carriage 9 is moved along track 8 by means of a lever 11, which is indirectly connected with the carriage 9 by a rod 12, and lever 13 mounted on a shaft 14 carried in bearings on carriage 4. Lever 11 is also mounted on shaft 14 and its length is such that the free end comes into a position convenient to the operator on the seat 6. A stop plate 15 is mounted at, or near, the outer ends of the rails 8, and two collars 16 are adjustably mounted on the coupling rod 12, the positions of which regulate the travel of carriage 9 in both directions.

The gathering ladle 3ᵃ is connected as shown to one end of lever 18 pivotally mounted on a stationary standard 19, the outer end of the lever 18 carrying a counterweight 20 of such proportion that it tends to raise the gathering ladle out of the gathering well and hold it in such position. The gathering ladle is, however, normally held immersed in the molten glass of the gathering well of the furnace, this being effected by means of a rod 21 connected at one end to the lever 18 at a point between its connection with standard 19 and the gathering ladle, having its other end in a position convenient to the operator on the seat 6, and being provided with a notch or catch 22 adapted to engage with the pin 23 extending laterally from one of the rails 8. It should be understood that the ladle, as shown in the drawings, is merely diagrammatic and that any suitable form of gathering device may be used.

Mounted upon or forming an integral portion of the carriage 9 is a guide block 24 in which is slidably mounted a flanged tube 25, the guide block being positioned so that the tube 25 is situated between the rails 8 with its flange 26 below the member 24. A pin 27 is bolted to the flange 26, to carry the hinges 28 for the two halves of the neck mold 29.

The tube 25 extends below the flange 26 and this downward extension 30 is cut away as shown in Fig. 2, the upper part of the two halves of the neck mold being so shaped that when the neck mold is closed, they embrace and engage this downward extension 30. Each of the two halves of the neck mold 29 is provided with an arm 31 to which the ends of a spring 32 are connected for holding the two halves of the neck mold in closed position. A diaphragm 132 is fixed in the tube 25, this tube also containing therein a movable tubular piston 33, which is traversed axially by a rod 34 on the lower end of which is mounted a plunger 35 that is shaped and adapted to act on the glass contained in the neck mold to form the mouth of the bottle. The upper end of the rod 34 is screw threaded and on this screw threaded portion is mounted two adjusting nuts 36, tube 25 being slotted as at 37, to enable access to be obtained to the adjusting nuts 36. By means of these nuts the tension of spring 38 may be varied, this spring encircling the rod 34 and bearing against the diaphragm 132. A hole 39 is pierced in the diaphragm 132 in order to place the upper side of the piston 33 in communication with the atmosphere.

The flange 26 on the tube 25 contains a passageway 40, which serves to place the interior of the tube 25 in communication with a pipe 42 which is mounted on the flange 26 by means of a flanged connection 140. This pipe 42 which toward its upper end is braced against the tube 25 by a collar 25ᵃ, is connected by means of a flexible connecting pipe (not shown) to a two way valve 42ᵃ which is controlled by the operator by means of the pedals 71 as hereinafter described. A pipe plug 41 is placed in the outer end of the passageway 40 so that the passageway may be readily cleaned when desired.

Forming an integral part of the carriage 9 and extending transversely across the same, is a member 43 which bears a pin 44 which extends downwardly between the rails 8, and serves as a bearing for the hinges 45 of the parison mold 46. A second pin 48 is supported between the rails 8 by member 47 of the carriage 9, this pin forming a support for a handle 49 which is connected through suitable linkage 50 with the two halves of the parison mold 46, for the opening or closing of the same.

A casting 51 is mounted on the two forward standards 7 and is provided with guides in which the slide 52 is movably mounted, this slide being operated by levers 55 and 53 mounted on a shaft 54. A bell crank lever 56 is pivotally mounted on slide 52, and carries on the extremity of one of its arms a knife blade 57, which when the slide 52 is moved toward the left, comes into contact with the glass string extending from the parison mold and severs it, a spring 58 being connected to the other arm of the lever 56, and holding the blade 57 elastically and in a position slightly inclined to the bottom of the parison mold 46.

The finishing mold or blowing mold 59 is, as usual made in two halves, which are pivotally mounted on a standard 60 mounted on the carriage 4 between and slightly in advance of the rearward standards 7, each half of the mold being provided with operating handles 61. The bottom mold 62 is shown mounted on a rod 63 carried by a bracket 64 also supported by the standard 60. A vertical rod 66, suitably guided, carries upon its upper end a grooved member 65 and is connected at its lower end with the one end of a bell crank lever 67, 69 mounted on a shaft 68, the lever arm 67 being counterbalanced by a weight 70 so that the member 65 is normally held in the position shown. The rod 66 is of such length that the collar 25ª can engage the groove in the plate 65 when the carriage 9 is moved to the right hand limit of its travel.

The two way valve 42ª is mounted on the standard 60 and is controlled by one or other of two pedals 71, of which only one is shown, these pedals being mounted on the carriage 4 and in front of the seat 6.

On each of the rearward standards 7 and situated above the upper end of the blowing or finishing mold 59 is a handle 72, these handles being adapted to act on the arms 31 of the neck mold 29 and open the mold against the action of its spring 32, when the neck mold is in a position directly over the finishing mold.

The flange 36 carries in addition to the pin 27, another and diametrically arranged pin 73, the lower ends of these pins 27, 73, being arranged to enter correspondingly disposed holes in the blowing or finishing mold 59 in order to center the neck mold with respect to the finishing or blowing mold 59 when seated thereon.

The valve 42ª is of ordinary two way construction, its function being to connect the passageway 40 and communicating spaces, with either a source of air under high pressure, or a source of air under sub-atmospheric pressure, these two sources also being connected to the valve 42ª by flexible means not shown.

The operation of the glass blowing machine is as follows:—

The operator taking his place on the seat 6, first disengages the rod 21 from the pin 23, the lever, under the influence of the counterweight then turning about its pivot and raising the gathering ladle out of the gathering well and into contact with the lower end of the parison mold 46. The operator depresses one of the levers 71, actuating the two way valve 42ª in such a manner as to place the interior of the parison mold 46, the neck mold 29, and the part of the tube 25 below the piston 33 in connection with the low pressure and thereby causing the molten glass to flow upwardly from the gathering ladle into the parison and neck molds. Before the molten glass reaches the neck mold 29, the atmospheric pressure on the upper face of the piston 33 overcomes the resistance of the spring 38 and causes the piston 33 and with it the rod 34 and plunger 35 to move downwardly until the plunger 35 occupies its normal relationship with the neck mold 29, thereby forming the neck of the bottle. When the parison mold 46 and the neck mold 29 have been filled, the operator pulls on the rod 21 until the gathering ladle is again immersed in the gathering well and held in such position by reëngagement of the rod 21 with the pin 23, the operator at the same time removing his foot from the lever 71 and disconnecting the source of vacuum from the tube 25. As the gathering ladle moves away from the parison mold 46, a string of glass connects the two parts, the string being cut off close to the bottom of the parison mold by the knife blade 57 which is actuated by the lever 55.

The carriage 9 is next caused to travel along the rails 8 and bring the parison mold into a position directly above the blowing or finishing mold 59, the collar 25ª of the tube 25 at the same time engaging with the groove in the plate 65. When the parison and neck mold are directly above the blowing or finishing mold 59, the latter being open and ready to receive the parison, the handle 49 at that time is in a position convenient to the operator who then actuates it and thus separates the two halves of the parison mold and releases the parison, which is then suspended from the neck mold 29, the neck mold now being supported from the grooved carrying plate 65 through the tube 25 and the collar 25ª. When thus suspended, the parison stretches under the influence of gravity assisted by compressed air, if desired, which may be admitted by means of the valve 42ª, by depression of the other of the levers 71, the admission of the compressed air to the tube 25 causing the piston 33, rod 34, and plunger 35 to move upwardly, if they have not already done so under the action of the spring 38. During the time the stretching is taking place a preparatory bottom mold may be held against the lower end of the parison. When the desired amount of stretching has taken place the operator actuates the lever 69 and thereby lowers the rod 66 and with it the grooved plate 65 which now supports the neck mold and parison until the parison is in position between the two halves of the blowing or finishing mold 59, which are then closed by means of the handle 61. Blowing is now effected by further admission of compressed air by means of the secondly mentioned lever 71, and when this is completed the levers 72 are actuated thus separating the two halves of the neck mold 29. The counterweight 70 will then act to raise the rod 66 and with it the tube 25 and the neck mold 29 until the latter is in its normal position above the parison mold 46, the two halves of which are closed by the operator actuating the handle 49. The operator then pushes the lever 11 and causes the carriage 9 to travel back to its initial position ready for the next cycle of operation.

The blown bottle remains in the blowing or finishing mold while the next cycle of operation is in progress and until the new parison formed during said cycle is ready to be lowered into the blowing or finishing mold. This gives the bottle time to set before its expulsion and is also of advantage in that it permits the heat in the bottom of the bottle to mount upward and reheat the neck or mouth of the bottle which is usually too much chilled due to the long contact with the neck mold. It will be noticed that the entire weight of the neck mold 29, tube 25, and the appurtenant parts, is free to act on the upper face of the parison mold and on the blowing or finishing mold and thus to establish a good self adjusting joint between the neck and blowing or finishing molds. This arrangement dispenses with the necessity of providing fine vertical adjustment between the neck and parison molds and between the neck and blowing molds so as to take care of the variations brought by the varying heat conditions.

The suction head of this machine, comprising the tube 25, the tubular piston 33, rod 34, plunger 35, and associated parts is more fully set forth and claimed in a separate application, Serial Number 152,344, filed March 3, 1917.

What I claim is:

1. In a machine for the manufacture of glass bottles, the combination with a carriage adapted to travel along a horizontal path, of a parison mold mounted thereon, a guide block also mounted on said carriage, said guide block supporting a vertically slidable tubular member in alinement with said parison mold, a neck mold carried by said tubular member and adapted to register with said parison mold, means to supply molten glass in alinement with said parison and neck molds when the carriage is at one point in its path of travel, and a finishing mold in alinement with said parison and neck molds when said carriage is at another point in its path of travel.

2. In a machine for the manufacture of glass articles, the combination with a tank for containing a supply of molten glass, of a parison mold open at its bottom suspended above said tank, a glass gathering device adapted to be interposed between said tank and said parison mold, means for moving said gathering device in a vertical path, and means for moving said parison mold in a horizontal path, whereby said parison mold may be moved from above said tank to a position vertically above and in vertical alinement with a fixed finishing mold.

3. In a machine for the manufacture of glass articles, the combination with a tank for containing a supply of molten glass, of a neck mold, a parison mold, and a finishing mold, means for horizontally conveying said neck mold and said parison mold together with a parison contained therein from a filling position above said tank to a point vertically above said finishing mold, means for opening the parison mold at that point and lowering the neck mold with the parison suspended therefrom into coöperative relationship with the finishing mold, means for closing said finishing mold around the parison and blowing the same, and means for returning said neck mold to coöperative position with said parison mold and returning said parison and neck molds to the filling position above the tank.

Dated this 29th day of January, 1917.

ARTHUR WILZIN.

Copies of this patent may be obtained for five cents each, by addressing the "Commissioner of Patents, Washington, D. C."